(12) United States Patent
Yoshioka et al.

(10) Patent No.: US 11,267,285 B2
(45) Date of Patent: *Mar. 8, 2022

(54) RUBBER COMPOSITION FOR TIRES AND PNEUMATIC TIRE

(71) Applicant: SUMITOMO RUBBER INDUSTRIES, LTD., Hyogo (JP)

(72) Inventors: Mikako Yoshioka, Hyogo (JP); Yuka Yokoyama, Hyogo (JP); Haruko Sawaki, Hyogo (JP); Takahiro Mabuchi, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 342 days.

This patent is subject to a terminal disclaimer.

(21) Appl. No.: 16/407,530

(22) Filed: May 9, 2019

(65) Prior Publication Data

US 2019/0366770 A1 Dec. 5, 2019

(30) Foreign Application Priority Data

May 29, 2018 (JP) .............................. JP2018-102589

(51) Int. Cl.
| | | |
|---|---|---|
| *B60C 1/00* | (2006.01) | |
| *B60C 11/00* | (2006.01) | |
| *C08F 136/06* | (2006.01) | |
| *C08L 9/00* | (2006.01) | |
| *C08L 23/26* | (2006.01) | |
| *C08L 7/00* | (2006.01) | |
| *C08L 47/00* | (2006.01) | |
| *C08K 3/04* | (2006.01) | |
| *C08K 3/01* | (2018.01) | |
| *C08L 15/00* | (2006.01) | |
| *C08K 5/548* | (2006.01) | |
| *C08K 3/30* | (2006.01) | |
| *C08L 97/00* | (2006.01) | |
| *C08K 3/36* | (2006.01) | |

(52) U.S. Cl.
CPC ........ *B60C 1/0016* (2013.01); *B60C 11/0008* (2013.01); *C08F 136/06* (2013.01); *C08K 3/01* (2018.01); *C08K 3/04* (2013.01); *C08K 3/30* (2013.01); *C08K 3/36* (2013.01); *C08K 5/548* (2013.01); *C08L 7/00* (2013.01); *C08L 9/00* (2013.01); *C08L 15/00* (2013.01); *C08L 23/26* (2013.01); *C08L 47/00* (2013.01); *C08L 97/005* (2013.01); *B60C 2011/0016* (2013.01); *C08K 2201/005* (2013.01); *C08K 2201/006* (2013.01)

(58) Field of Classification Search
CPC .... C08L 9/00; C08L 7/00; C08L 47/00; C08L 23/26; C08L 15/00; C08L 97/005; C08F 136/06; B60C 1/0016; B60C 11/0008; B60C 2011/0016; C08K 3/36; C08K 3/04; C08K 2201/005; C08K 2201/006; C08K 3/01; C08K 5/548; C08K 3/30
See application file for complete search history.

(56) References Cited

U.S. PATENT DOCUMENTS

| | | | | |
|---|---|---|---|---|
| 2005/0148713 | A1* | 7/2005 | Labauze | C08L 7/00 524/311 |
| 2009/0306269 | A1* | 12/2009 | Ota | C08L 7/00 524/437 |
| 2016/0052340 | A1 | 2/2016 | Miyazaki et al. | |
| 2017/0361658 | A1* | 12/2017 | Sanders | B60C 11/12 |
| 2018/0079895 | A1 | 3/2018 | Buisman et al. | |
| 2018/0105683 | A1* | 4/2018 | Miyazaki | C08K 5/11 |
| 2018/0236816 | A1 | 8/2018 | Maekawa | |
| 2018/0297406 | A1* | 10/2018 | Yokoyama | C08L 9/00 |
| 2019/0040240 | A1 | 2/2019 | Miyazaki et al. | |
| 2019/0367705 | A1* | 12/2019 | Yoshioka | C08L 23/24 |
| 2020/0299489 | A1* | 9/2020 | Tsuda | B60C 1/00 |

FOREIGN PATENT DOCUMENTS

| | | |
|---|---|---|
| JP | 2009-91482 A | 4/2019 |
| WO | 2016098908 | 6/2016 |
| WO | 2017145480 | 8/2017 |

* cited by examiner

*Primary Examiner* — Angela C Scott
(74) *Attorney, Agent, or Firm* — Greenblum & Bernstein, P.L.C.

(57) ABSTRACT

The present invention provides a rubber composition for treads, containing: a rubber component including an isoprene-based rubber and polybutadiene rubber; silica; carbon black; a terpene-based resin; and a water-soluble fine particle and/or a foaming agent, the terpene-based resin having a softening point of 70-150° C., an α-pinene unit content of 65-100% by mass, and a β-pinene unit content of 0-35% by mass, the rubber component including, based on 100% by mass thereof, 20-80% by mass of the isoprene-based rubber and 20-80% by mass of the polybutadiene rubber, with a combined amount of the isoprene-based rubber and the polybutadiene rubber of 90% by mass or more, the rubber composition containing, per 100 parts by mass of the rubber component, 20-200 parts by mass of the silica, 0.1-50 parts by mass of the carbon black, and 0.1-50 parts by mass of the terpene-based resin.

12 Claims, No Drawings

RUBBER COMPOSITION FOR TIRES AND PNEUMATIC TIRE

TECHNICAL FIELD

The present invention relates to a rubber composition for tires, and a pneumatic tire including the rubber composition.

BACKGROUND ART

Studded tires or tire chains have been used for driving on snowy and icy roads. However, since they cause environmental problems such as dust pollution, studless winter tires have been proposed to replace them. The materials and structure of the studless winter tires are designed to allow the tires to be used on snowy or icy roads with rougher surfaces than normal roads. For example, there have been developed rubber compositions which contain diene rubbers having excellent low-temperature properties, or which contain a large amount of softeners to enhance the softening effect (see, for example, Patent Literature 1).

From an environmental standpoint, it has recently been desirable to further provide good abrasion resistance and other properties in addition to snow and ice performance. Thus, there is a need for a balanced improvement of these properties.

CITATION LIST

Patent Literature

Patent Literature 1: JP 2009-091482 A

SUMMARY OF INVENTION

Technical Problem

In this context, the present invention aims to provide a rubber composition for tires that provides a balanced improvement of snow and ice performance, wet grip performance, abrasion resistance, and handling stability, and a tire including the rubber composition.

Solution to Problem

The present invention relates to a rubber composition for treads, containing: a rubber component including an isoprene-based rubber and polybutadiene rubber; silica; carbon black; a terpene-based resin; and at least one of a water-soluble fine particle or a foaming agent, the terpene-based resin having a softening point of 70 to 150° C., an α-pinene unit content of 65 to 100% by mass, and a β-pinene unit content of 0 to 35% by mass, the rubber component including, based on 100% by mass thereof, 20 to 80% by mass of the isoprene-based rubber and 20 to 80% by mass of the polybutadiene rubber, with a combined amount of the isoprene-based rubber and the polybutadiene rubber of 90% by mass or more, the rubber composition containing, per 100 parts by mass of the rubber component, 20 to 200 parts by mass of the silica, 0.1 to 50 parts by mass of the carbon black, and 0.1 to 50 parts by mass of the terpene-based resin.

Preferably, the terpene-based resin is at least one selected from the group consisting of α-pinene homopolymers, terpene-based resins having an α-pinene unit content of 99% by mass or higher, and copolymers containing an α-pinene unit and a β-pinene unit.

Preferably, the water-soluble fine particle has a median particle size of 0.1 to 500 μm.

Preferably, the water-soluble fine particle is at least one selected from the group consisting of magnesium sulfate, potassium sulfate, sodium chloride, calcium chloride, magnesium chloride, potassium carbonate, sodium carbonate, lignin derivatives, and saccharides.

Preferably, the polybutadiene rubber has a cis content of 90% by mass or higher.

Preferably, the polybutadiene rubber is a modified polybutadiene rubber that has been modified with a polar group interactive with silica.

Preferably, the silica has a nitrogen adsorption specific surface area of 160 to 300 m²/g.

Preferably, the rubber composition has an E* at 0° C. of 3.0 to 8.0 and a difference between E* at −10° C. and E* at 10° C. of 7.0 or less.

Another aspect of the present invention relates to a pneumatic tire, including a tread, the tread containing the rubber composition.

Preferably, the tread in the pneumatic tire has a surface with pores having a pore size of 300 μm or less.

Preferably, the pneumatic tire is a studless winter tire.

Advantageous Effects of Invention

The rubber composition for treads of the present invention contains predetermined amounts of a rubber component including an isoprene-based rubber and polybutadiene rubber, silica, carbon black, a specific terpene-based resin, and a water-soluble fine particle and/or a foaming agent. Such a rubber composition provides a balanced improvement of snow and ice performance, wet grip performance, abrasion resistance, and handling stability.

DESCRIPTION OF EMBODIMENTS

The rubber composition for treads contains predetermined amounts of a rubber component including an isoprene-based rubber and polybutadiene rubber, silica, carbon black, a terpene-based resin having a softening point of 70 to 150° C., an α-pinene unit content of 65 to 100% by mass, and a β-pinene unit content of 0 to 35% by mass, and a water-soluble fine particle and/or a foaming agent. The combined use of the specific rubber component including predetermined amounts of an isoprene-based rubber and polybutadiene rubber with the specific terpene-based resin and the water-soluble fine particle and/or foaming agent (at least one selected from the group consisting of the water-soluble fine particle and the foaming agent) provides a balanced improvement of snow and ice performance, wet grip performance, abrasion resistance, and handling stability.

The reason for this effect is not clear, but it is believed that it may be due to the following mechanism.

The specific terpene-based resin has notably high compatibility with isoprene-based rubbers. Thus, it is believed that even when this resin is incorporated into a soft rubber composition, e.g. for use in winter tires, it will improve snow and ice performance without reducing abrasion resistance. It is also believed that when the terpene-based resin has a molecular weight (e.g. Mn, Mz, Mw) controlled within a predetermined range, it has further improved compatibility with isoprene-based rubbers, which makes it possible to prevent a decrease in performance due to blooming and other issues and thus to maintain snow and ice performance for a long period of time.

Moreover, it is believed that the use of a water-soluble fine particle and/or a foaming agent allows the resulting rubber composition to have pores (cells) which provide a water draining function and also lead to increased roughness of the rubber surface, thereby improving abrasion resistance while improving wet grip performance and snow and ice performance. Moreover, despite the fact that such cell- or pore-forming rubber compositions tend to show extremely reduced abrasion resistance as compared to those which have no cell (pore)-forming ability, the present invention makes it possible to improve wet grip performance and snow and ice performance while maintaining abrasion resistance by using the specific terpene-based resin. This is probably because the terpene-based resin that is based primarily on an α-pinene monomer enhances rubber flexibility, provides high affinity for rubber, and can also co-cure with rubber, thereby improving abrasion resistance, and also because such a α-pinene monomer-based resin has steric properties that are suitable particularly for improving snow and ice performance and abrasion resistance, even as compared to conventional limonene or ρ-pinene resins.

Therefore, the rubber composition provides a significantly improved balance of snow and ice performance, wet grip performance, abrasion resistance, and handling stability and further can provide good long-term maintenance (durability) of these properties.

(Rubber Component)

The rubber composition contains a rubber component including an isoprene-based rubber and polybutadiene rubber.

Examples of the isoprene-based rubber include natural rubber (NR), polyisoprene rubber (IR), refined NR, modified NR, and modified IR. The NR and IR may be those commonly used in the tire industry. Examples of the NR include SIR20, RSS#3, and TSR20, while examples of the IR include IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These isoprene-based rubbers may be used alone or in combinations of two or more.

In view of the balance of snow and ice performance, wet grip performance, abrasion resistance, and handling stability, the amount of the isoprene-based rubber based on 100% by mass of the rubber component is 20% by mass or more, preferably 25% by mass or more, more preferably 30% by mass or more. The amount is 80% by mass or less, preferably 70% by mass or less, more preferably 60% by mass or less.

Any polybutadiene rubber (BR) may be used, including, for example, those commonly used in the tire industry such as high-cis BR, BR containing 1,2-syndiotactic polybutadiene crystals (SPB-containing BR), polybutadiene rubber synthesized using rare earth catalysts (rare earth-catalyzed BR), and polybutadiene rubber modified with tin compounds (tin-modified BR). For example, commercial products available from Ube Industries, Ltd., JSR Corporation, Asahi Kasei Corporation, and Zeon Corporation may be used as the BR. These may be used alone or in combinations of two or more.

For good snow and ice performance, abrasion resistance, and other properties, the BR preferably has a cis content of 90% by mass or higher, more preferably 95% by mass or higher.

Herein, the cis content (cis-1,4 linkage content) is calculated from signal intensities measured by infrared absorption spectrometry or NMR analysis.

In view of the balance of snow and ice performance, wet grip performance, abrasion resistance, and handling stability, the amount of the BR based on 100% by mass of the rubber component is 20% by mass or more, preferably 30% by mass or more, more preferably 40% by mass or more, still more preferably 50% by mass or more. The upper limit of the amount is 80% by mass or less, preferably 70% by mass or less, more preferably 65% by mass or less.

The BR may be either unmodified BR or a modified BR.

The modified BR may be, for example, a BR having a polar group interactive with silica. For example, it may be a chain end-modified BR obtained by modifying at least one chain end of BR with a compound (modifier) having the polar group (i.e., a chain end-modified BR terminated with the polar group); a backbone-modified BR having the polar group in the backbone; a backbone- and chain end-modified BR having the polar group in both the backbone and chain end (e.g., a backbone- and chain end-modified BR in which the backbone has the polar group, and at least one chain end is modified with the modifier); or a chain end-modified BR that has been modified (coupled) with a polyfunctional compound having two or more epoxy groups in the molecule so that a hydroxyl or epoxy group is introduced.

Examples of the polar group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These polar groups may be substituted. Preferred among these are amino (preferably amino whose hydrogen atom is replaced with a C1-C6 alkyl group), alkoxy (preferably C1-C6 alkoxy), and alkoxysilyl (preferably C1-C6 alkoxysilyl) groups.

The modified BR may suitably be, for example: (1) a BR modified with a compound (modifier) represented by the following formula:

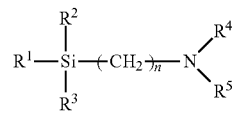

wherein $R^1$, $R^2$, and $R^3$ are the same or different and each represent an alkyl, alkoxy, silyloxy, acetal, carboxyl (—COOH), or mercapto (—SH) group, or a derivative thereof; $R^4$ and $R^5$ are the same or different and each represent a hydrogen atom or an alkyl group, and $R^4$ and $R^5$ may be joined together to form a ring structure with the nitrogen atom; and n represents an integer.

The BR modified with the compound (modifier) of the above formula may suitably be, for example, a BR obtained by modifying the polymerizing end (active terminal) of a solution-polymerized polybutadiene rubber with the compound of the above formula, among others.

$R^1$, $R^2$, and $R^3$ are each suitably an alkoxy group, preferably a C1-C8, more preferably C1-C4 alkoxy group; $R^4$ and $R^5$ are each suitably an alkyl group, preferably a C1-C3 alkyl group; and n is preferably 1 to 5, more preferably 2 to 4, still more preferably 3. When $R^4$ and $R^5$ are joined together to form a ring structure with the nitrogen atom, the ring structure is preferably a 4- to 8-membered ring. The term "alkoxy group" encompasses cycloalkoxy (e.g. cyclohexyloxy) and aryloxy (e.g. phenoxy, benzyloxy) groups.

Specific examples of the modifier include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Preferred among these are 3-dimethylaminopropyltrimethoxysilane, 3-dimethylaminopropyltriethoxysilane, and 3-diethylaminopropyltrimethoxysilane. These may be used alone or in combinations of two or more.

The modified BR may also suitably be a BR modified with any of the following compounds (modifiers), for example: polyglycidyl ethers of polyols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl)carbamyl chloride, 4-morpholinecarbonyl chloride, 1-pyrrolidinecarbonyl chloride, N,N-dimethylcarbamic acid chloride, and N,N-diethylcarbamic acid chloride; epoxy group-containing silane compounds such as 1,3-bis(glycidyloxypropyl)-tetramethyldisiloxane and (3-glycidyloxypropyl)-pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl)propyl]sulfide, (trimethylsilyl) [3-(tributoxysilyl)propyl]sulfide, (trimethylsilyl) [3-(methyldimethoxysilyl)propyl]sulfide, (trimethylsilyl) [3-(methyldiethoxysilyl)propyl]sulfide, (trimethylsilyl) [3-(methyldipropoxysilyl)propyl]sulfide, and (trimethylsilyl) [3-(methyldibutoxysilyl)propyl]sulfide;

N-substituted aziridine compounds such as ethylene imine and propylene imine; alkoxysilanes such as methyltriethoxysilane; (thio)benzophenone compounds containing an amino group and/or a substituted amino group such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N,N,N',N'-bis(tetraethylamino)benzophenone; benzaldehyde compounds containing an amino group and/or a substituted amino group such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam; and N,N-bis(2,3-epoxypropoxy)aniline, 4,4-methylene-bis(N,N-glycidylaniline), tris(2,3-epoxypropyl)-1,3,5-triazine-2,4,6-triones, N,N-diethylacetamide, N-methylmaleimide, N,N-diethyl urea, 1,3-dimethylethylene urea, 1,3-divinylethylene urea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis(diphenylamino)-2-propanone, and 1,7-bis(methylethylamino)-4-heptanone. The modified BR is preferably one modified with an alkoxysilane, among others.

The modification with any of the compounds (modifiers) may be performed by known methods.

Another example of the modified BR may be: (2) one produced by a method that includes: modification step (A) of performing a modification reaction to introduce an alkoxysilane compound having two or more reactive groups, including an alkoxysilyl group, into the active terminal of a BR having an active terminal; and condensation step (B) of performing a condensation reaction of the residual group of the alkoxysilane compound introduced into the active terminal, in the presence of a condensation catalyst containing at least one element selected from the group consisting of the elements of Groups 4, 12, 13, 14, and 15 of the periodic table, wherein the BR is produced by polymerization in the presence of a catalyst composition mainly containing a mixture of the following components (a) to (c):

component (a): a lanthanoid-containing compound which contains at least one element selected from the group consisting of lanthanoids, or a reaction product obtained by reaction between the lanthanoid-containing compound and a Lewis base;

component (b): at least one compound selected from the group consisting of aluminoxanes and organoaluminum compounds represented by the formula (1): $AlR^aR^bR^c$ wherein $R^a$ and $R^b$ are the same or different and each represent a C1-C10 hydrocarbon group or a hydrogen atom, and $R^c$ is the same as or different from $R^a$ or $R^b$ and represents a C1-C10 hydrocarbon group; and component (c): an iodine-containing compound which contains at least one iodine atom in its molecular structure.

In other words, the modified BR (modified BR(I)) may be produced by performing a modification reaction to introduce an alkoxysilane compound into the active terminal of a BR having an active terminal (BR(I)), and then performing a condensation reaction of the residual group of the alkoxysilane compound introduced into the active terminal, in the presence of a condensation catalyst containing at least one of the elements of Groups 4, 12, 13, 14, and 15 of the periodic table.

The modification step (A) includes performing a modification reaction to introduce an alkoxysilane compound having two or more reactive groups, including an alkoxysilyl group, into the active terminal of a BR having an active terminal (BR(I)).

The BR(I) may be, for example, a polymer having repeating units derived from at least one monomer selected from the group consisting of 1,3-butadiene, isoprene, 2,3-dimethyl-1,3-butadiene, 1,3-pentadiene, 1,3-hexadiene, and myrcene.

The BR(I) may be produced by polymerization in the presence or absence of a solvent. The solvent for the polymerization (polymerization solvent) may be an inert organic solvent. Specific examples include C4-C10 saturated aliphatic hydrocarbons such as butane, pentane, hexane, and heptane; C6-C20 saturated alicyclic hydrocarbons such as cyclopentane and cyclohexane; monoolefins such as 1-butene and 2-butene; aromatic hydrocarbons such as benzene, toluene, and xylene; and halogenated hydrocarbons such as methylene chloride, chloroform, carbon tetrachloride, trichloroethylene, perchloroethylene, 1,2-dichloroethane, chlorobenzene, bromobenzene, and chlorotoluene.

The polymerization temperature in the production of the BR(I) is preferably −30 to 200° C., more preferably 0 to 150° C. The polymerization reaction may be carried out in any reaction mode, such as using a batch reactor or continuously using a multistage continuous reactor or other devices. The polymerization solvent, if used, preferably has a monomer concentration of 5 to 50% by mass, more preferably 7 to 35% by mass. Moreover, in view of efficiency in the production of the BR and in order to prevent deactivation of the BR having an active terminal, the polymerization system preferably contains as small an amount as possible of deactivating compounds such as oxygen, water, and carbon dioxide gas.

The BR(I) is produced by polymerization in the presence of a catalyst composition (hereinafter, also referred to as "catalyst") mainly containing a mixture of components (a) to (c).

The component (a) is a lanthanoid-containing compound which contains at least one element selected from the group consisting of lanthanoids, or a reaction product obtained by reaction between the lanthanoid-containing compound and a Lewis base. Preferred among the lanthanoids are neodymium, praseodymium, cerium, lanthanum, gadolinium, and samarium, with neodymium being particularly preferred. These lanthanoids may be used alone or in combinations of two or more. Specific examples of the lanthanoid-containing compound include lanthanoid carboxylates, alkoxides, f-diketone complexes, phosphates, and phosphites. Preferred among these are carboxylates or phosphates, with carboxylates being more preferred.

Specific examples of the lanthanoid carboxylates include carboxylates represented by the formula (2): $(R^d-COO)_3M$ wherein M represents a lanthanoid and each $R^d$ is the same or different and represents a C1-C20 hydrocarbon group. $R^d$ in formula (2) is preferably a saturated or unsaturated alkyl group and also preferably a linear, branched, or cyclic alkyl group. The carboxyl group is bound to a primary, secondary, or tertiary carbon atom. Specific examples include salts of octanoic acid, 2-ethylhexanoic acid, oleic acid, stearic acid, benzoic acid, naphthenic acid, and "versatic acid" (trade name, available from Shell Chemicals, a carboxylic acid whose carboxyl group is bound to a tertiary carbon atom). Preferred among these are salts of versatic acid, 2-ethyl-hexanoic acid, and naphthenic acid.

Specific examples of the lanthanoid alkoxides include those represented by the formula (3): $(R^eO)_3M$ wherein M represents a lanthanoid. Specific examples of the alkoxy group represented by "$R^eO$" in formula (3) include 2-ethylhexylalkoxy, oleylalkoxy, stearylalkoxy, phenoxy, and benzylalkoxy groups. Preferred among these are 2-ethyl-hexylalkoxy and benzylalkoxy groups.

Specific examples of the lanthanoid-β-diketone complexes include acetylacetone complexes, benzoylacetone complexes, propionitrileacetone complexes, valerylacetone complexes, and ethylacetylacetone complexes. Preferred among these are acetylacetone complexes and ethylacetylacetone complexes.

Specific examples of the lanthanoid phosphates or phosphites include bis(2-ethylhexyl) phosphate, bis(1-methylheptyl) phosphate, bis(p-nonylphenyl) phosphate, bis(polyethyleneglycol-p-nonylphenyl) phosphate, (1-methylheptyl) (2-ethylhexyl) phosphate, (2-ethylhexyl) (p-nonylphenyl) phosphate, mono-2-ethylhexyl (2-ethylhexyl)phosphonate, mono-p-nonylphenyl (2-ethylhexyl)phosphonate, bis(2-ethylhexyl) phosphinic acid, bis(1-methylheptyl)phosphinic acid, bis(p-nonylphenyl)phosphinic acid, (1-methylheptyl) (2-ethylhexyl)phosphinic acid, and (2-ethylhexyl) (p-nonylphenyl)phosphinic acid salts. Preferred among these are bis(2-ethylhexyl) phosphate, bis(1-methylheptyl) phosphate, mono-2-ethylhexyl (2-ethylhexyl)phosphonate, and bis(2-ethylhexyl)phosphinic acid salts.

Among the above lanthanoid-containing compounds, neodymium phosphates or carboxylates are particularly preferred, with neodymium versatate or neodymium 2-ethylhexanoate being most preferred.

In order to solubilize the lanthanoid-containing compound in a solvent or stably store the compound for a long period of time, it is also preferred to mix the lanthanoid-containing compound with a Lewis base, or react the lanthanoid-containing compound with a Lewis base to give a reaction product. The amount of the Lewis base per mol of the lanthanoid is preferably 0 to 30 mol, more preferably 1 to 10 mol. Specific examples of the Lewis base include acetylacetone, tetrahydrofuran, pyridine, N,N-dimethylformamide, thiophene, diphenyl ether, triethylamine, organophosphorus compounds, and monohydric or dihydric alcohols. The above-mentioned components (a) may be used alone or in combinations of two or more.

The component (b) is at least one compound selected from the group consisting of aluminoxanes and organoaluminum compounds represented by the formula (1): $AlR^aR^bR^c$ wherein $R^a$ and $R^b$ are the same or different and each represent a C1-C10 hydrocarbon group or a hydrogen atom, and $R^c$ is the same as or different from $R^a$ or $R^b$ and represents a C1-C10 hydrocarbon group.

The term "aluminoxane" (hereinafter, also referred to as "alumoxane") refers to a compound having a structure represented by the following formula (4) or (5), and may include alumoxane association complexes as disclosed in Fine Chemical, 23, (9), 5 (1994), J. Am. Chem. Soc., 115, 4971 (1993), and J. Am. Chem. Soc., 117, 6465 (1995), all of which are hereby incorporated by reference in their entirety.

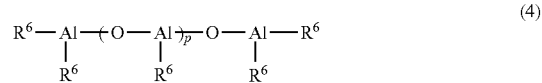

(4)

(5)

In formulas (4) and (5), each $R^6$ is the same or different and represents a C1-C20 hydrocarbon group, and p represents an integer of 2 or larger.

Specific examples of $R^6$ include methyl, ethyl, propyl, butyl, isobutyl, t-butyl, hexyl, isohexyl, octyl, and isooctyl groups. Preferred among these are methyl, ethyl, isobutyl, and t-butyl groups, with a methyl group being particularly preferred.

The symbol p is preferably an integer of 4 to 100.

Specific examples of the alumoxanes include methylalumoxane (hereinafter, also referred to as "MAO"), ethylalumoxane, n-propylalumoxane, n-butylalumoxane, isobutylalumoxane, t-butylalumoxane, hexylalumoxane, and isohexylalumoxane. Preferred among these is MAO. The alumoxanes may be produced by known methods, such as, for example, by adding a trialkylaluminum or dialkylaluminum monochloride to an organic solvent such as benzene, toluene, or xylene, and then adding water, steam, steam-containing nitrogen gas, or a salt having water of crystallization such as copper sulfate pentahydrate or aluminum sulfate hexadecahydrate to react them. These alumoxanes may be used alone or in combinations of two or more.

Specific examples of the organoaluminum compounds of formula (1) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, and isobutylaluminum dihydride. Preferred among these are diisobutylaluminum hydride, triethylaluminum, triisobutylaluminum, and diethylaluminum hydride, with diisobutylaluminum hydride being particularly preferred. These organoaluminum compounds may be used alone or in combinations of two or more.

The component (c) is an iodine-containing compound which contains at least one iodine atom in its molecular structure. The use of such an iodine-containing compound facilitates production of a BR having a cis content of 94% by mass or higher. The iodine-containing compound may be any compound that contains at least one iodine atom in its molecular structure, and examples include iodine, trimethylsilyl iodide, diethylaluminum iodide, methyl iodide, butyl iodide, hexyl iodide, octyl iodide, iodoform, diiodomethane, benzylidene iodide, beryllium iodide, magnesium iodide, calcium iodide, barium iodide, zinc iodide, cadmium iodide, mercury iodide, manganese iodide, rhenium iodide, copper iodide, silver iodide, and gold iodide.

In particular, the iodine-containing compound is preferably a silicon iodide compound represented by the formula (6): $R^7_q SiI_{4-q}$ wherein each $R^7$ is the same or different and represents a C1-C20 hydrocarbon group or a hydrogen atom, and q represents an integer of 0 to 3; a hydrocarbon iodide compound represented by the formula (7): $R^8_r I_{4-r}$ wherein each $R^8$ is the same or different and represents a C1-C20 hydrocarbon group, and r represents an integer of 1 to 3; or iodine. Such silicon iodide compounds, hydrocarbon iodide compounds, and iodine are well soluble in organic solvents, and thus are easy to handle and useful for industrial production.

Specific examples of the silicon iodide compounds (compounds of formula (6)) include trimethylsilyl iodide, triethylsilyl iodide, and dimethylsilyl diiodo. Preferred among these is trimethylsilyl iodide.

Specific examples of the hydrocarbon iodide compounds (compounds of formula (7)) include methyl iodide, butyl iodide, hexyl iodide, octyl iodide, iodoform, diiodomethane, and benzylidene iodide. Preferred among these are methyl iodide, iodoform, and diiodomethane.

Among these iodine-containing compounds, iodine, trimethylsilyl iodide, triethylsilyl iodide, dimethylsilyl diiodo, methyl iodide, iodoform, and diiodomethane are particularly preferred, with trimethylsilyl iodide being most preferred.

These iodine-containing compounds may be used alone or in combinations of two or more.

The mixing ratio of the components (components (a) to (c)) may be appropriately selected as needed. For example, the amount of component (a) per 100 g of a conjugated diene compound is preferably 0.00001 to 1.0 mmol, more preferably 0.0001 to 0.5 mmol.

The amount of the alumoxane used as component (b), may be defined as the molar ratio of component (a) to the aluminum (Al) contained in the alumoxane. The molar ratio of "component (a)" to "aluminum (Al) contained in alumoxane" is preferably 1:1 to 1:500, more preferably 1:3 to 1:250, still more preferably 1:5 to 1:200.

The amount of the organoaluminum compound used as component (b), may be defined as the molar ratio of component (a) to the organoaluminum compound. The molar ratio of "component (a)" to "organoaluminum compound" is preferably 1:1 to 1:700, more preferably 1:3 to 1:500.

The amount of component (c) may be defined as the molar ratio of the iodine atom contained in component (c) to component (a). The molar ratio of "iodine atom contained in component (c)" to "component (a)" is preferably 0.5 to 3.0, more preferably 1.0 to 2.5, still more preferably 1.2 to 2.0.

In addition to components (a) to (c), the catalyst preferably contains at least one compound selected from the group consisting of conjugated diene compounds and non-conjugated diene compounds, as appropriate, in an amount of 1000 mol or less, more preferably of 3 to 1000 mol, still more preferably 5 to 300 mol per mol of component (a). The catalyst containing at least one compound selected from the group consisting of conjugated diene compounds and non-conjugated diene compounds has much improved catalytic activity and is thus preferred. Examples of conjugated diene compounds that can be used include 1,3-butadiene and isoprene. Examples of the non-conjugated diene compounds include divinylbenzene, diisopropenylbenzene, triisopropenylbenzene, 1,4-vinylhexadiene, and ethylidene norbornene.

The catalyst composition mainly containing a mixture of components (a) to (c) may be prepared, for example, by reacting components (a) to (c) dissolved in a solvent, and optionally at least one compound selected from the group consisting of conjugated diene compounds and non-conjugated diene compounds. The components may be added in any order in the preparation. However, in order to improve polymerization activity and reduce the induction period for initiation of polymerization, it is preferred that the components be previously mixed, reacted, and aged. The aging temperature is preferably 0 to 100° C., more preferably 20 to 80° C. The aging time is not particularly critical. Moreover, the components may be brought into contact with each other in a production line before being added to a polymerization reaction vessel. In this case, an aging time of at least 0.5 minutes is sufficient. The prepared catalyst will be stable for several days.

The BR(I) to be used for preparing the modified BR(I) preferably has a ratio of the weight average molecular weight (Mw) to the number average molecular weight (Mn) measured by gel permeation chromatography, i.e., a molecular weight distribution (Mw/Mn), of 3.5 or less, more preferably 3.0 or less, still more preferably 2.5 or less. A molecular weight distribution of more than 3.5 tends to lead to decreases in rubber properties, including tensile properties and low heat build-up properties. Moreover, the lower limit of the molecular weight distribution is not particularly critical.

The term "molecular weight distribution (Mw/Mn)" refers to a value calculated as the ratio of weight average molecular weight to number average molecular weight (weight average molecular weight/number average molecular weight). The weight average molecular weight of the BR is measured by gel permeation chromatography (GPC) calibrated with polystyrene standards. The number average molecular weight of the BR is measured by GPC calibrated with polystyrene standards.

The vinyl content and cis content of the BR(I) may be easily controlled by adjusting the polymerization temperature. The Mw/Mn may also be easily controlled by adjusting the molar ratio of components (a) to (c).

The BR(I) preferably has a Mooney viscosity at 100° C. ($ML_{1+4}$, 100° C.) within a range of 5 to 50, more preferably 10 to 40. The Mooney viscosity may be easily controlled by adjusting the molar ratio of components (a) to (c).

The BR(I) preferably has a 1,2-vinyl bond content (1,2-vinyl content, vinyl content) of 0.5% by mass or lower, more preferably 0.4% by mass or lower, still more preferably 0.3% by mass or lower. The 1,2-vinyl bond content of the BR(I) is also preferably 0.001% by mass or higher, more preferably 0.01% by mass or higher.

The 1,2-vinyl bond content of the BR is calculated from signal intensities measured by NMR analysis.

The alkoxysilane compound used in modification step (A) (hereinafter, also referred to as "modifier") has two or more reactive groups, including an alkoxysilyl group. The type of reactive group other than the alkoxysilyl group is not particularly limited, but is preferably, for example, at least one functional group selected from the group consisting of (f) an epoxy group, (g) an isocyanate group, (h) a carbonyl group, and (i) a cyano group. The alkoxysilane compound may be in the form of a partial condensate or a mixture of the alkoxysilane compound and the partial condensate.

The term "partial condensate" refers to an alkoxysilane compound in which some (i.e. not all) of SiOR (wherein OR represents an alkoxy group) groups are joined by condensation to form SiOSi bonds. The BR to be used in the modification reaction preferably has at least 10% living polymer chains.

Specific suitable examples of the alkoxysilane compound that contains (f) an epoxy group (hereinafter, also referred to as "epoxy group-containing alkoxysilane compound") include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. More preferred among these is 3-glycidoxypropyltrimethoxysilane or 2-(3,4-epoxycyclohexyl)ethyltrimethoxysilane.

Moreover, examples of the alkoxysilane compound that contains (g) an isocyanate group (hereinafter, also referred to as "isocyanate group-containing alkoxysilane compound") include 3-isocyanatopropyltrimethoxysilane, 3-isocyanatopropyltriethoxysilane, 3-isocyanatopropylmethyldiethoxysilane, and 3-isocyanatopropyltriisopropoxysilane. Particularly preferred among these is 3-isocyanatopropyltrimethoxysilane.

Moreover, examples of the alkoxysilane compound that contains (h) a carbonyl group (hereinafter, also referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, and 3-methacryloyloxypropyltriisopropoxysilane. Among these, 3-methacryloyloxypropyltrimethoxysilane is particularly preferred.

Furthermore, examples of the alkoxysilane compound that contains (i) a cyano group (hereinafter, also referred to as "cyano group-containing alkoxysilane compound") include 3-cyanopropyltriethoxysilane, 3-cyanopropyltrimethoxysilane, 3-cyanopropylmethyldiethoxysilane, and 3-cyanopropyltriisopropoxysilane. Particularly preferred among these is 3-cyanopropyltrimethoxysilane.

Among these modifiers, 3-glycidoxypropyltrimethoxysilane, 2-(3,4-epoxycyclohexyl)ethyltrimethoxysilane, 3-isocyanatopropyltrimethoxysilane, 3-methacryloyloxypropyltrimethoxysilane, and 3-cyanopropyltrimethoxysilane are particularly preferred, with 3-glycidoxypropyltrimethoxysilane being most preferred.

These modifiers may be used alone or in combinations of two or more. Partial condensates of the alkoxysilane compounds may also be used.

In modification step (A), the amount of the alkoxysilane compound per mol of component (a) used in the modification reaction is preferably 0.01 to 200 mol, more preferably 0.1 to 150 mol. The modifier may be added in any manner, for example, all at once, in portions, or continuously. Preferably, it is added all at once.

The modification reaction is preferably performed in a solution. The solution used in the polymerization which contains unreacted monomers may be directly used as this solution. The modification reaction may be carried out in any reaction mode, such as using a batch reactor or continuously using a multistage continuous reactor, inline mixer, or other devices. Moreover, the modification reaction is preferably performed after completion of the polymerization reaction and before solvent removal, water treatment, heat treatment, the procedures necessary for polymer isolation, and other operations.

The temperature of the modification reaction may be the same as the polymerization temperature during the polymerization of the BR. Specifically, it is preferably 20 to 100° C., more preferably 30 to 90° C. The reaction time in the modification reaction is preferably five minutes to five hours, more preferably 15 minutes to one hour. In condensation step (B), after the introduction of the alkoxysilane compound residue into the active terminal of the polymer, known antioxidants or reaction terminators may optionally be added.

In modification step (A), it is preferred to add, in addition to the modifier, an agent which can be consumed by a condensation reaction with the alkoxysilane compound residue, i.e. the modifier introduced into the active terminal, in condensation step (B). Specifically, it is preferred to add a functional group-introducing agent.

The functional group-introducing agent may be any compound that substantially does not directly react with the active terminal but remains unreacted in the reaction system. For example, the functional group-introducing agent is preferably an alkoxysilane compound that is different from the alkoxysilane compound used as the modifier, i.e., an alkoxysilane compound that contains at least one functional group selected from the group consisting of (j) an amino group, (k) an imino group, and (l) a mercapto group. The alkoxysilane compound used as the functional group-introducing agent may be in the form of a partial condensate or a mixture of the partial condensate and the alkoxysilane compound used as the functional group-introducing agent which is not a partial condensate.

Specific examples of the functional group-introducing agent that is an alkoxysilane compound containing (j) an amino group (hereinafter, also referred to as "amino group-containing alkoxysilane compound") include 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)propyltrimethoxysilane, 3-(N-methylamino)propyltriethoxysilane, 3-(1-pyrrolidinyl)propyl(triethoxy)silane, and 3-(l-pyrrolidinyl)propyl(trimethoxy)silane; N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(l-methylpropylidene)-3-(triethoxysilyl)-1-propaneamine, N-(4-N,N-dimethylaminobenzylidene)-3-(triethoxysilyl)-1-propaneamine, and N-(cyclohexylidene)-3-(triethoxysilyl)-1-propaneamine, and trimethoxysilyl, methyldiethoxysilyl, ethyldiethoxysilyl, methyldimethoxysilyl, or ethyldimethoxysilyl compounds corresponding to the foregoing triethoxysilyl compounds. Particularly preferred among these are 3-diethylaminopropyl(triethoxy)silane, 3-dimethylaminopropyl(triethoxy)silane, 3-aminopropyltriethoxysilane, N-(1-methylpropylidene)-3-(triethoxysilyl)-1-propaneamine, and N-(1,3-dimethylbutylidene)-3-(triethoxysilyl)-1-propaneamine.

Moreover, suitable examples of the alkoxysilane compound containing (k) an imino group (hereinafter, also referred to as "imino group-containing alkoxysilane compound") include 3-(1-hexamethyleneimino)propyl(triethoxy)silane, 3-(1-hexamethyleneimino)propyl(trimethoxy)silane, (1-hexamethyleneimino)methyl(trimethoxy)silane, (l-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, and 3-(1-hexamethyleneimino)propyl(diethoxy)ethylsilane; and 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, N-(3-isopropoxysilylpropyl)-4,5-dihydroimidazole, and N-(3-methyldiethoxysilylpropyl)-4,5-dihydroimidazole. Among these, 3-(1-hexamethyleneimino) propyl(triethoxy)silane, 3-(1-hexamethyleneimino)propyl(trimethoxy)silane, (1-hexamethyleneimino)methyl(trimethoxy)silane, 1-[3-(triethoxysilyl)propyl]-4,5-dihydroimidazole, and 1-[3-(trimethoxysilyl)propyl]-4,5-dihydroimidazole are more preferred.

Moreover, examples of the alkoxysilane compound containing (1) a mercapto group (hereinafter, also referred to as "mercapto group-containing alkoxysilane compound") include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, and mercaptophenyltriethoxysilane. Particularly preferred among these is 3-mercaptopropyltriethoxysilane.

Among these functional group-introducing agents, 3-diethylaminopropyl(triethoxy)silane, 3-dimethylaminopropyl(triethoxy)silane, 3-aminopropyltriethoxysilane, 3-(1-hexamethyleneimino)propyl(triethoxy)silane, N-(1-methylpropylidene)-3-(triethoxysilyl)-1-propaneamine, N-(1,3-dimethylbutylidene)-3-(triethoxysilyl)-1-propaneamine, 3-(1-hexamethyleneimino)propyl(trimethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, and 3-mercaptopropyltriethoxysilane are particularly preferred, with 3-aminopropyltriethoxysilane being most preferred.

These functional group-introducing agents may be used alone or in combinations of two or more.

The amount of the alkoxysilane compound used as the functional group-introducing agent, per mol of component (a) is preferably 0.01 to 200 mol, more preferably 0.1 to 150 mol.

The functional group-introducing agent is preferably added after the introduction of the alkoxysilane compound residue into the active terminal of the BR(I) in modification step (A) and before the start of the condensation reaction in condensation step (B). If added after the start of the condensation reaction, the functional group-introducing agent may not uniformly disperse, resulting in reduced catalytic performance. Specifically, the functional group-introducing agent is preferably added five minutes to five hours after the start of the modification reaction, more preferably 15 minutes to one hour after the start of the modification reaction.

When the functional group-containing alkoxysilane compound is used as the functional group-introducing agent, a modification reaction occurs between the BR(I) having an active terminal and a substantially stoichiometric amount of the modifier added to the reaction system, thereby introducing the alkoxysilyl group into substantially all active terminals; further, the functional group-introducing agent is added, whereby the alkoxysilane compound residues are introduced in an amount more than the equivalent amount of the active terminal of the BR.

In view of reaction efficiency, the condensation reaction between alkoxysilyl groups preferably occurs between a free alkoxysilane compound and the alkoxysilyl group present at the end of the BR, or optionally between the alkoxysilyl groups at the ends of the BRs. It is not preferred to perform a reaction between free alkoxysilane compounds. Thus, when an alkoxysilane compound is further added as a functional group-introducing agent, its alkoxysilyl group preferably has lower hydrolyzability than the alkoxysilyl group introduced into the end of the BR.

For example, it is preferred to combine a compound containing a trimethoxysilyl group with high hydrolyzability as the alkoxysilane compound to be reacted with the active terminal of the BR(I) with a compound containing an alkoxysilyl group (e.g. a triethoxysilyl group) with lower hydrolyzability than the trimethoxysilyl group-containing compound as the alkoxysilane compound to be further added as a functional group-introducing agent.

The condensation step (B) includes performing a condensation reaction of the residual group of the alkoxysilane compound introduced into the active terminal, in the presence of a condensation catalyst containing at least one element selected from the group consisting of the elements of Groups 4, 12, 13, 14, and 15 of the periodic table.

The condensation catalyst may be any condensation catalyst that contains at least one element selected from the group consisting of the elements of Groups 4, 12, 13, 14, and 15 of the periodic table. Preferably, for example, the condensation catalyst contains at least one element selected from the group consisting of titanium (Ti) (Group 4), tin (Sn)

(Group 14), zirconium (Zr) (Group 4), bismuth (Bi) (Group 15), and aluminum (Al) (Group 13).

Specific examples of the condensation catalyst that contains tin (Sn) include bis(n-octanoato)tin, bis(2-ethylhexanoato)tin, bis(laurato)tin, bis(naphthenato)tin, bis(stearato)tin, bis(oleato)tin, dibutyltin diacetate, dibutyltin di-n-octanoate, dibutyltin di-2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate), and di-n-octyltin bis(2-ethylhexylmaleate).

Examples of the condensation catalyst that contains zirconium (Zr) include tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl oxide)zirconium, zirconium tributoxystearate, zirconium tributoxyacetylacetonate, zirconium dibutoxy bis(acetylacetonate), zirconium tributoxyethylacetoacetate, zirconium butoxyacetylacetonate bis(ethylacetoacetate), zirconium tetrakis(acetylacetonate), zirconium diacetylacetonate bis(ethylacetoacetate), bis(2-ethylhexanoato)zirconium oxide, bis(laurato)zirconium oxide, bis(naphthenato)zirconium oxide, bis(stearato) zirconium oxide, bis(oleato)zirconium oxide, bis(linoleato) zirconium oxide, tetrakis(2-ethylhexanoato)zirconium, tetrakis(laurato)zirconium, tetrakis(naphthenato)zirconium, tetrakis(stearato)zirconium, tetrakis(oleato)zirconium, and tetrakis(linoleato)zirconium.

Examples of the condensation catalyst that contains bismuth (Bi) include tris(2-ethylhexanoato)bismuth, tris(laurato)bismuth, tris(naphthenato)bismuth, tris(stearato)bismuth, tris(oleato)bismuth, and tris(linoleato)bismuth.

Examples of the condensation catalyst that contains aluminum (Al) include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl oxide)aluminum, aluminum dibutoxystearate, aluminum dibutoxyacetylacetonate, aluminum butoxy bis(acetylacetonate), aluminum dibutoxyethylacetoacetate, aluminum tris(acetylacetonate), aluminum tris(ethylacetoacetate), tris(2-ethylhexanoato)aluminum, tris(laurato)aluminum, tris(naphthenato)aluminum, tris(stearato)aluminum, tris(oleato)aluminum, and tris(linoleato)aluminum.

Examples of the condensation catalyst that contains titanium (Ti) include tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, tetra(2-ethylhexyl oxide) titanium, bis(octane dioleate)bis(2-ethylhexyl oxide)titanium, tetra(octane dioleate)titanium, titanium lactate, titanium dipropoxy bis(triethanolaminate), titanium dibutoxy bis(triethanolaminate), titanium tributoxystearate, titanium tripropoxystearate, titanium tripropoxyacetylacetonate, titanium dipropoxy bis(acetylacetonate), titanium tripropoxyethylacetoacetate, titanium propoxyacetylacetonate bis(ethylacetoacetate), titanium tributoxyacetylacetonate, titanium dibutoxy bis(acetylacetonate), titanium tributoxyethylacetoacetate, titanium butoxyacetylacetonate bis(ethylacetoacetate), titanium tetrakis(acetylacetonate), titanium diacetylacetonate bis(ethylacetoacetate), bis(2-ethylhexanoato)titanium oxide, bis(laurato)titanium oxide, bis(naphthenato)titanium oxide, bis(stearato)titanium oxide, bis(oleato)titanium oxide, bis(linoleato)titanium oxide, tetrakis(2-ethylhexanoato) titanium, tetrakis(laurato)titanium, tetrakis(naphthenato) titanium, tetrakis(stearato)titanium, tetrakis(oleato)titanium, and tetrakis(linoleato)titanium.

Among the above-mentioned condensation catalysts, titanium (Ti)-containing condensation catalysts are more preferred. Among such titanium (Ti)-containing condensation catalysts, alkoxides, carboxylates, and acetylacetonate complex salts of titanium (Ti) are still more preferred, with tetra-i-propoxytitanium (tetraisopropyl titanate) being particularly preferred. The use of a titanium (Ti)-containing condensation catalyst can more effectively promote the condensation reaction of the residue of the alkoxysilane compound used as the modifier and the residue of the alkoxysilane compound used as the functional group-introducing agent.

As to the amount of the condensation catalyst, the number of moles of the above-mentioned compounds that may be used as the condensation catalyst is preferably 0.1 to 10 mol, particularly preferably 0.3 to 5 mol per mol of the total alkoxysilyl groups in the reaction system.

The condensation catalyst may be added before the modification reaction, but is preferably added after the modification reaction and before the start of the condensation reaction. Specifically, the condensation catalyst is preferably added five minutes to five hours after the start of the modification reaction, more preferably 15 minutes to one hour after the start of the modification reaction.

The condensation reaction in condensation step (B) is preferably performed in an aqueous solution. The temperature during the condensation reaction is preferably 85 to 180° C., more preferably 100 to 170° C., particularly preferably 110 to 150° C.

The condensation reaction is preferably performed in an aqueous solution with a pH of 9 to 14, more preferably 10 to 12. When the aqueous solution has a pH in the above-mentioned range, the condensation reaction can be promoted to improve the temporal stability of the modified BR(I).

The reaction time of the condensation reaction is preferably five minutes to 10 hours, more preferably about 15 minutes to five hours. Moreover, the pressure in the reaction system during the condensation reaction is preferably 0.01 to 20 MPa, more preferably 0.05 to 10 MPa.

The condensation reaction may be carried out in any reaction mode, such as using a batch reactor or continuously using a multistage continuous reactor or other devices. Moreover, solvent removal may be performed simultaneously with the condensation reaction.

After the condensation reaction is performed as described above, a conventional post treatment may be performed to obtain a target modified BR.

Another example of the modified BR may be: (3) a tin-modified BR.

The tin-modified BR is preferably, but not limited to, a tin-modified polybutadiene rubber (BR) produced by polymerization using a lithium initiator and which has a tin atom content of 50 to 3000 ppm, a vinyl content of 5 to 50% by mass, and a molecular weight distribution of 2 or less.

The tin-modified BR is preferably one prepared by polymerizing 1,3-butadiene using a lithium initiator and then adding a tin compound, and which has a tin-carbon bond at the molecular end.

Examples of the lithium initiator include lithium compounds such as alkyllithiums and aryllithiums.

Examples of the tin compound include tin tetrachloride and butyltin trichloride.

The tin-modified BR preferably has a tin atom content of 50 ppm or higher. The tin atom content is also preferably 3000 ppm or lower, more preferably 300 ppm or lower.

The tin-modified BR preferably has a molecular weight distribution (Mw/Mn) of 2 or less. The lower limit of the molecular weight distribution is not particularly critical, but is preferably 1 or more. The tin-modified BR preferably has a vinyl content of 5% by mass or higher. The vinyl content is also preferably 50% by mass or lower, more preferably 20% by mass or lower.

In view of the balance of snow and ice performance, wet grip performance, abrasion resistance, and handling stability, the combined amount of the isoprene-based rubber and BR based on 100% by mass of the rubber component in the rubber composition is 90% by mass or more, preferably 95% by mass or more, more preferably 100% by mass.

The rubber component of the rubber composition may include other rubber component species as long as the effect is not impaired. Examples of other rubber component species include diene rubbers such as styrene butadiene rubber (SBR), acrylonitrile butadiene rubber (NBR), chloroprene rubber (CR), butyl rubber (IIR), and styrene-isoprene-butadiene copolymer rubber (SIBR).

(Silica)

In view of the balance of snow and ice performance, wet grip performance, abrasion resistance, and handling stability, the rubber composition contains silica as filler. Examples of the silica include dry silica (anhydrous silica) and wet silica (hydrous silica). Among these, wet silica is preferred because it contains a large number of silanol groups. For example, commercial products available from Degussa, Rhodia, Tosoh Silica Corporation, Solvay Japan, and Tokuyama Corporation may be used. These may be used alone or in combinations of two or more.

The amount of the silica per 100 parts by mass of the rubber component is 20 parts by mass or more, preferably 30 parts by mass or more, more preferably 40 parts by mass or more. The upper limit of the amount is 200 parts by mass or less, preferably 150 parts by mass or less, more preferably 100 parts by mass or less, still more preferably 80 parts by mass or less. When the amount is within the range indicated above, the silica tends to disperse well so that an excellent balance between snow and ice performance and abrasion resistance, and other properties can be achieved.

The silica preferably has a nitrogen adsorption specific surface area ($N_2SA$) of 160 $m^2/g$ or more, more preferably 165 $m^2/g$ or more. The upper limit of the $N_2SA$ of the silica is not particularly critical, but is preferably 300 $m^2/g$ or less, more preferably 200 $m^2/g$ or less. When the $N_2SA$ is within the range indicated above, the silica tends to disperse well so that an excellent balance between snow and ice performance and abrasion resistance, and other properties can be achieved.

The $N_2SA$ of the silica is measured by the BET method in accordance with ASTM D3037-93.

In view of the balance of snow and ice performance, wet grip performance, abrasion resistance, and handling stability, the silica content based on 100% by mass in total of the silica and carbon black in the rubber composition is preferably 50% by mass or more, more preferably 80% by mass or more, still more preferably 90% by mass or more.

(Silane Coupling Agent)

The rubber composition which contains silica preferably further contains a silane coupling agent.

Non-limiting examples of the silane coupling agent include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, NXT and NXT-Z both available from Momentive, and Si363 available from Evonik; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. For example, commercial products available from Degussa, Momentive, Shin-Etsu Silicone, Tokyo Chemical Industry Co., Ltd., AZmax. Co., and Dow Corning Toray Co., Ltd. may be used. These may be used alone or in combinations of two or more.

The amount of the silane coupling agent per 100 parts by mass of the silica is preferably 3 parts by mass or more, more preferably 6 parts by mass or more. The amount is also preferably 20 parts by mass or less, more preferably 15 parts by mass or less, still more preferably 12 parts by mass or less, further preferably 10 parts by mass or less. When the amount is within the range indicated above, an effect commensurate with the amount tends to be obtained, and a good balance of snow and ice performance, wet grip performance, abrasion resistance, and handling stability also tend to be achieved.

(Carbon Black)

In view of the balance of antistatic properties, wet grip performance, abrasion resistance, and handling stability, the rubber composition contains carbon black as filler. Non-limiting examples of the carbon black include N134, N110, N220, N234, N219, N339, N330, N326, N351, N550, and N762. For example, commercial products available from Asahi Carbon Co., Ltd., Cabot Japan K.K., Tokai Carbon Co., Ltd., Mitsubishi Chemical Corporation, Lion Corporation, NSCC Carbon Co., Ltd., and Columbia Carbon may be used. These may be used alone or in combinations of two or more.

The amount of the carbon black per 100 parts by mass of the rubber component is 0.1 parts by mass or more, preferably 1 part by mass or more, more preferably 3 parts by mass or more. Also, the amount is 50 parts by mass or less, preferably 20 parts by mass or less, more preferably 10 parts by mass or less, still more preferably 7 parts by mass or less. When the amount is within the range indicated above, the carbon black tends to disperse well so that a good balance of snow and ice performance, wet grip performance, abrasion resistance, fuel economy, and handling stability can be achieved.

The carbon black preferably has a nitrogen adsorption specific surface area ($N_2SA$) of 50 $m^2/g$ or more, more preferably 80 $m^2/g$ or more, still more preferably 100 $m^2/g$ or more. The $N_2SA$ is also preferably 200 $m^2/g$ or less, more preferably 150 $m^2/g$ or less, still more preferably 130 $m^2/g$ or less. When the $N_2SA$ is within the range indicated above, the carbon black tends to disperse well so that a good balance of snow and ice performance, wet grip performance, abrasion resistance, and handling stability can be achieved.

The nitrogen adsorption specific surface area of the carbon black is determined in accordance with JIS K6217-2: 2001.

(Terpene-Based Resin)

In view of the balance of snow and ice performance, wet grip performance, abrasion resistance, and handling stability, the rubber composition contains a terpene-based resin having predetermined softening point and α- and β-pinene unit contents.

The amount of the terpene-based resin per 100 parts by mass of the rubber component is 0.1 parts by mass or more, preferably 10 parts by mass or more, more preferably 15 parts by mass or more, still more preferably 20 parts by mass or more. Also, the amount is 50 parts by mass or less, preferably 40 parts by mass or less. When the amount is within the range indicated above, a good balance of snow and ice performance, wet grip performance, abrasion resistance, and handling stability tends to be achieved.

The terpene-based resin has a softening point of 70 to 150° C. The lower limit of the softening point is preferably 100° C. or higher, more preferably 110° C. or higher, while the upper limit is preferably 140° C. or lower, more preferably 135° C. or lower. The terpene-based resin having a softening point not lower than the lower limit tends to provide good abrasion resistance. The terpene-based resin having a softening point not higher than the upper limit tends to provide good processability.

The softening point is measured in accordance with ASTM D6090 (published in 1997).

The terpene-based resin preferably has a number average molecular weight (Mn) of 500 to 775. The lower limit of the Mn is more preferably 580 or more, still more preferably 620 or more, while the upper limit is more preferably 765 or less, still more preferably 755 or less. When the Mn is within the range indicated above, a good balance of snow and ice performance, wet grip performance, abrasion resistance, and handling stability tends to be achieved.

The terpene-based resin preferably has a z-average molecular weight (Mz) of 1300 to 1600. The lower limit of the Mz is more preferably 1310 or more, still more preferably 1320 or more, while the upper limit is more preferably 1570 or less, still more preferably 1550 or less. When the Mz is within the range indicated above, a good balance of snow and ice performance, wet grip performance, abrasion resistance, and handling stability tends to be achieved.

The terpene-based resin preferably has a weight average molecular weight (Mw) of 800 to 1100. When the Mw is within the range indicated above, a good balance of snow and ice performance, wet grip performance, abrasion resistance, and handling stability tends to be achieved.

The terpene-based resin preferably has a molecular weight distribution (Mw/Mn) of 1.30 to 1.70. When the Mw/Mn is within the range indicated above, a good balance of snow and ice performance, wet grip performance, abrasion resistance, and handling stability tends to be achieved.

The Mn, Mw, and Mz are measured by gel permeation/size exclusion chromatography (GPC-SEC) as set forth in ASTM D5296 (published in 2005).

The terpene-based resin preferably has a glass transition temperature (Tg) of 25 to 90° C. The lower limit of the Tg is more preferably 35° C. or higher, still more preferably 38° C. or higher, while the upper limit is more preferably 85° C. or lower, still more preferably 81° C. or lower. When the Tg is within the range indicated above, a good balance of snow and ice performance, wet grip performance, abrasion resistance, and handling stability tends to be achieved.

The Tg is measured using a differential scanning calorimeter (SC Q2000 available from TA Instruments) in accordance with ASTM D6604 (published in 2013).

The terpene-based resin preferably has a limonene unit content (amount of limonene units based on 100% by mass of the terpene-based resin) of 10% by mass or lower, more preferably 5% by mass or lower, still more preferably 1% by mass or lower, particularly preferably 0% by mass.

The terpene-based resin may be a homopolymer of a single terpene (terpene monomer), a copolymer of two or more terpenes, or a copolymer of at least one terpene and at least one additional monomer other than terpenes.

The terpene used for forming the terpene-based resin has a basic molecular formula represented by $(C_5H_8)_n$, wherein n represents the number of linked isoprene units and is 2 or more. Suitable examples of the terpene include α-pinene, β-pinene, δ-3-carene, and β-phellandrene; pyrolysates of α-pinene, β-pinene, δ-3-carene, δ-2-carene, and terpinene; and combinations thereof. Among these, α-pinene or β-pinene is preferred, with α-pinene being more preferred.

In view of the balance of snow and ice performance, wet grip performance, abrasion resistance, and handling stability, the terpene-based resin preferably has a terpene unit content (amount of terpene units based on 100% by mass of the terpene-based resin) of 80% by mass or more, more preferably 90% by mass or more, still more preferably 95% by mass or more, particularly preferably 99% by mass or more. Such a terpene-based resin may be a homopolymer or copolymer having only terpene structural units.

The terpene-based resin may suitably be a polymer containing an α-pinene unit or a polymer containing an α-pinene unit and a β-pinene unit. More specifically, it may be, for example, an α-pinene homopolymer, a terpene-based resin having an α-pinene unit content of 99% by mass or higher, or a copolymer containing an α-pinene unit and a β-pinene unit.

In view of the balance of snow and ice performance, wet grip performance, abrasion resistance, and handling stability, the terpene-based resin has an α-pinene unit content (amount of α-pinene units based on 100% by mass of the terpene-based resin) within a range of 65 to 100% by mass. The α-pinene unit content is preferably 70% by mass or higher, more preferably 80% by mass or higher, still more preferably 90% by mass or higher, and may be 100% by mass.

In view of the balance of snow and ice performance, wet grip performance, abrasion resistance, and handling stability, the terpene-based resin has a β-pinene unit content (amount of β-pinene units based on 100% by mass of the terpene-based resin) within a range of 0 to 35% by mass. The β-pinene unit content is preferably 30% by mass or lower, more preferably 20% by mass or lower, still more preferably 15% by mass or lower, particularly preferably 10% by mass or lower, and may be 0% by mass.

In view of the balance of snow and ice performance, wet grip performance, abrasion resistance, and handling stability, the terpene-based resin preferably has a combined content of α- and β-pinene units (combined amount of α- and β-pinene units based on 100% by mass of the terpene-based resin) of 80% by mass or higher, more preferably 90% by mass or higher, still more preferably 95% by mass or higher, particularly preferably 99% by mass or higher.

The terpene-based resin may be synthesized, for example, by cationic polymerization of one or two or more terpene monomers using a Lewis acid catalyst.

Non-limiting examples of the Lewis acid catalyst include metal halides such as $BF_3$, $BBr_3$, $AlF_3$, $AlBr_3$, $TiCl_4$, $TiBr_4$, $TiL_4$, $FeCl_3$, $FeCl_2$, $SnCl_4$, $WCl_6$, $MoCl_5$, $ZrCl_4$, $SbCl_3$, $SbCl_5$, $TeCl_2$, and $ZnCl_2$; metal alkyl compounds such as $Et_3Al$, $Et_2AlCl_3$, $EtAlCl_2$, $Et_3Al_2Cl_3$, $(i\text{-}Bu)_3Al$, $(i\text{-}Bu)_2AlCl$, $(i\text{-}Bu)AlCl_2$, $Me_4Sn$, $Et_4Sn$, $Bu_4Sn$, and $Bu_3SnCl$; and metal alkoxy compounds such as $Al(OR)_{3-x}Cl_x$ and $Ti(OR)_{4-y}Cl_y$, wherein R represents an alkyl group or an aryl group, x represents an integer of 1 or 2, and y represents an integer of 1 to 3. The examples also include: (i) combinations of $AlCl_3$ and alkyl tertiary amines such as trimethylamine, (ii) combinations of $AlCl_3$ and organosilicon compounds such as trialkyl silicon halides, lower dialkyl phenyl silicon halides, or hexaalkyldisiloxanes, (iii) combinations of $AlCl_3$ and organogermanium halides such as trimethylgermanium chloride or triethylgermanium ethoxide, and (iv) C1-C18 lower alkyl groups.

When the cationic polymerization is performed by solution polymerization, the solvent to be used may be any solvent that allows polymerization of terpene monomers. Examples include halogenated hydrocarbons, aromatic hydrocarbons, and aliphatic hydrocarbons. Specific examples include halogenated hydrocarbon solvents such as methylene chloride, chloroform, 1,1-dichloromethane, 1,2-dichloroethane, n-propyl chloride, 1-chloro-n-butane, and 2-chloro-n-butane; aromatic hydrocarbon solvents such as benzene, toluene, xylene, anisole, and naphtha; and aliphatic hydrocarbon solvents such as pentane, hexane, heptane, octane, cyclopentane, cyclohexane, methylcyclohexane, and ethylcyclohexane. The polymerization reaction may be carried out, for example, at a temperature of −120 to 100° C., −80 to 80° C., or 5 to 50° C.

(Water-Soluble Fine Particle)

The water-soluble fine particle may be any fine particle soluble in water. For example, materials having a water solubility of at least 1 g/100 g of water at 20° C. may be used.

In view of ice performance and other properties, the water-soluble fine particle preferably has a median particle size (median size, D50) of 0.1 to 1 mm. The lower limit of the D50 is more preferably 1 μm or more, still more preferably 2 μm or more, while the upper limit is more preferably 800 μm or less, still more preferably 500 μm or less.

Herein, the median particle size can be measured by laser diffraction.

The amount of the water-soluble fine particle per 100 parts by mass of the rubber component is preferably 1 part by mass or more, more preferably 5 parts by mass or more, still more preferably 15 parts by mass or more, further preferably 20 parts by mass or more, particularly preferably 25 parts by mass or more. When the amount is not less than the lower limit, good snow and ice performance tends to be obtained. The amount is also preferably 100 parts by mass or less, more preferably 70 parts by mass or less, still more preferably 60 parts by mass or less, particularly preferably 50 parts by mass or less. When the amount is not more than the upper limit, good rubber properties such as abrasion resistance tend to be obtained.

Examples of the water-soluble fine particle include water-soluble inorganic salts and water-soluble organic substances. These may be used alone or in combinations of two or more.

Examples of the water-soluble inorganic salts include metal sulfates such as magnesium sulfate and potassium sulfate; metal chlorides such as potassium chloride, sodium chloride, calcium chloride, and magnesium chloride; metal hydroxides such as potassium hydroxide and sodium hydroxide; carbonates such as potassium carbonate and sodium carbonate; and phosphates such as sodium hydrogen phosphate and sodium dihydrogen phosphate.

Examples of the water-soluble organic substances include lignin derivatives and saccharides.

Suitable examples of the lignin derivatives include lignin sulfonic acid and lignosulfonates. The lignin derivatives may be prepared by a sulfite pulping method or a kraft pulping method.

Examples of the lignosulfonates include alkali metal salts, alkaline earth metal salts, ammonium salts, and alcohol amine salts of lignin sulfonic acid. Preferred among these are alkali metal salts (e.g. potassium or sodium salts) and alkaline earth metal salts (e.g. calcium, magnesium, lithium, or barium salts) of lignin sulfonic acid.

The lignin derivative preferably has a degree of sulfonation of 1.5 to $8.0/OCH_3$. Such a lignin derivative includes a lignin sulfonic acid and/or lignosulfonate in which lignin and/or a degradation product thereof is at least partially substituted with a sulfo group (sulfone group). The sulfo group of the lignin sulfonic acid may be unionized, or the hydrogen atom of the sulfo group may be replaced by an ion such as a metal ion. The degree of sulfonation is more preferably 3.0 to $6.0/OCH_3$. When the degree of sulfonation is within the range indicated above, good ice performance tends to be obtained.

The degree of sulfonation of the lignin derivative particle (lignin derivative that forms the particle) refers to the ratio of introduced sulfo groups calculated by the following equation:

Degree of sulfonation $(/OCH_3) = (S$ atoms (mol) of the sulfone groups in the lignin derivative)/(the methoxyl groups (mol) in the lignin derivative).

The saccharide may be any monosaccharide, oligosaccharide, or polysaccharide having any number of carbon atoms. Examples of such monosaccharides include trioses such as aldotriose and ketotriose; tetroses such as erythrose and threose; pentoses such as xylose and ribose; hexoses such as mannose, allose, altrose, and glucose; and heptoses such as sedoheptulose. Examples of such oligosaccharides include disaccharides such as sucrose and lactose; trisaccharides such as raffinose and melezitose; tetrasaccharides such as acarbose and stachyose; and higher oligosaccharides such as xylooligosaccharide and cellooligosaccharide. Examples of such polysaccharides include glycogen, starch (amylose, amylopectin), cellulose, hemicellulose, dextrin, and glucan.

The water-soluble fine particle may suitably be at least one selected from the group consisting of magnesium sulfate, potassium sulfate, sodium chloride, calcium chloride, magnesium chloride, potassium carbonate, sodium carbonate, lignin derivatives, and saccharides.

(Foaming Agent)

Any type of foaming agent may be used including those known in the tire industry. Examples include azodicarbonamide (ADCA), dinitrosopentamethylenetetramine (DPT), dinitrosopentastyrenetetramine, benzenesulfonyl hydrazide derivatives, p,p'-oxybis(benzenesulfonyl hydrazide) (OBSH), carbon dioxide-generating ammonium bicarbonate, sodium bicarbonate, ammonium carbonate, nitrogen-generating nitrososulfonylazo compounds, N,N'-dimethyl-N,N'-dinitrosophthalamide, toluenesulfonyl hydrazide, p-toluenesulfonyl semicarbazide, and p,p'-oxybis(benzenesulfonyl semicarbazide). Among these, azodicarbonamide (ADCA) or dinitrosopentamethylenetetramine (DPT) is preferred, with azodicarbonamide (ADCA) being more preferred.

The amount of the foaming agent per 100 parts by mass of the rubber component is preferably 1 part by mass or more, more preferably 5 parts by mass or more. When the amount is not less than the lower limit, good snow and ice performance tends to be obtained. The amount is also preferably 20 parts by mass or less, more preferably 15 parts by mass or less. When the amount is not more than the upper limit, good rubber properties such as abrasion resistance tend to be obtained.

A rubber vulcanizate obtained by vulcanizing the rubber composition containing the foaming agent preferably has an expansion ratio of 0.1 to 50%, more preferably 3 to 40%. When the expansion ratio is within the range indicated above, it is possible to ensure the formation of cells which can effectively function as drainage channels, while maintaining a moderate amount of cells, thereby avoiding risk of impairing durability. The expansion ratio of the rubber vulcanizate refers to an average expansion ratio (Vs), specifically calculated by the following equation (I):

$$Vs=(\rho_0/\rho_1-1)\times 100(\%) \quad (I)$$

wherein pi represents the density (g/cm$^3$) of the rubber vulcanizate (foamed rubber), and $\rho_0$ represents the density (g/cm$^3$) of the solid phase of the rubber vulcanizate (foamed rubber).

(Liquid Plasticizer)

In view of processability and the balance of snow and ice performance, wet grip performance, abrasion resistance, and handling stability, the rubber composition preferably contains a liquid plasticizer. The term "liquid plasticizer" refers to a plasticizer that is liquid at room temperature (25° C.).

The amount of the liquid plasticizer per 100 parts by mass of the rubber component is preferably 0.1 parts by mass or more, more preferably 10 parts by mass or more, still more preferably 15 parts by mass or more. The amount is also preferably 100 parts by mass or less, more preferably 60 parts by mass or less, still more preferably 40 parts by mass or less. When the amount is within the range indicated above, a good balance of snow and ice performance, wet grip performance, abrasion resistance, and handling stability tends to be achieved.

Examples of the liquid plasticizer include oils, liquid resins, and liquid diene polymers. These may be used alone or in combinations of two or more.

Examples of the oils include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. For example, commercial products available from Idemitsu Kosan Co., Ltd., Sankyo Yuka Kogyo K. K., Japan Energy Corporation, Olisoy, H&R, Hokoku Corporation, Showa Shell Sekiyu K. K., Fuji Kosan Co., Ltd., and The Nisshin OilliO Group, Ltd. may be used.

Examples of the liquid diene polymers include diene polymers which are liquid at 25° C., such as liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), liquid styrene-isoprene-styrene block copolymers (liquid SIS block polymers), liquid farnesene polymers, and liquid farnesene-butadiene copolymers. The chain end or backbone of these polymers may be modified with polar groups.

(Other Materials)

The rubber composition may contain a solid resin (resin that is solid at room temperature (25° C.)) other than the terpene-based resins. Examples of the solid resin include aromatic vinyl polymers, coumarone-indene resins, coumarone resins, indene resins, phenolic resins, rosin resins, petroleum resins, and acrylic resins. The combined amount of the terpene-based resin and the solid resin (additional resin) other than the terpene-based resins, if present, is preferably 0.1 to 100 parts by mass, more preferably 10 to 70 parts by mass per 100 parts by mass of the rubber component.

In view of crack resistance, ozone resistance, and other properties, the rubber composition preferably contains an antioxidant.

Non-limiting examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)-propionate]methane. Among these, p-phenylenediamine or quinoline antioxidants are preferred, with N-(1,3-dimethylbutyl)-N'-phenyl-p-phenylenediamine or 2,2,4-trimethyl-1,2-dihydroquinoline polymer being more preferred. For example, commercial products available from Seiko Chemical Co., Ltd., Sumitomo Chemical Co., Ltd., Ouchi Shinko Chemical Industrial Co., Ltd., and Flexsys may be used.

The amount of the antioxidant per 100 parts by mass of the rubber component is preferably 0.2 parts by mass or more, more preferably 0.5 parts by mass or more. When the amount is not less than the lower limit, sufficient ozone resistance tends to be obtained. The amount is also preferably 7.0 parts by mass or less, more preferably 4.0 parts by mass or less. When the amount is not more than the upper limit, a good tire appearance tends to be obtained.

The rubber composition preferably contains stearic acid. The amount of the stearic acid per 100 parts by mass of the rubber component is preferably 0.5 to 10 parts by mass, more preferably 0.5 to 5 parts by mass.

The stearic acid may be a conventional one, and examples include products available from NOF Corporation, Kao Corporation, Wako Pure Chemical Industries, Ltd., and Chiba Fatty Acid Co., Ltd.

The rubber composition preferably contains zinc oxide. The amount of the zinc oxide per 100 parts by mass of the rubber component is preferably 0.5 to 10 parts by mass, more preferably 1 to 5 parts by mass.

The zinc oxide may be a conventional one, and examples include products available from Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The rubber composition may contain a wax. Non-limiting examples of the wax include petroleum waxes and natural waxes, as well as synthetic waxes produced by purifying or chemically treating a plurality of waxes. These waxes may be used alone or in combinations of two or more.

Examples of the petroleum waxes include paraffin waxes and microcrystalline waxes. Any natural wax derived from non-petroleum resources may be used, and examples include plant waxes such as candelilla wax, carnauba wax, Japan wax, rice bran wax, and jojoba wax; animal waxes such as beeswax, lanolin, and spermaceti; mineral waxes such as ozokerite, ceresin, and petrolatum; and purified products of the foregoing waxes. For example, commercial products available from Ouchi Shinko Chemical Industrial Co., Ltd., Nippon Seiro Co., Ltd., and Seiko Chemical Co., Ltd. may be used. The amount of the wax may be appropriately selected in view of ozone resistance and cost.

The rubber composition preferably contains sulfur in order to moderately crosslink the polymer chains, thereby providing good properties.

The amount of the sulfur per 100 parts by mass of the rubber component is preferably 0.1 parts by mass or more, more preferably 0.5 parts by mass or more, still more preferably 0.7 parts by mass or more, but is preferably 6.0 parts by mass or less, more preferably 4.0 parts by mass or less, still more preferably 3.0 parts by mass or less. When the amount is within the range indicated above, good properties tend to be obtained.

Examples of the sulfur include those commonly used in the rubber industry, such as powdered sulfur, precipitated sulfur, colloidal sulfur, insoluble sulfur, highly dispersible sulfur, and soluble sulfur. For example, commercial products available from Tsurumi Chemical Industry Co., Ltd., Karuizawa Sulfur Co., Ltd., Shikoku Chemicals Corporation, Flexsys, Nippon Kanryu Industry Co., Ltd., and Hosoi Chemical Industry Co., Ltd. may be used. These may be used alone or in combinations of two or more.

The rubber composition preferably contains a vulcanization accelerator.

The amount of the vulcanization accelerator is not particularly critical and may be freely selected according to the desired cure rate or crosslink density. The amount is usually 0.3 to 10 parts by mass, preferably 0.5 to 7 parts by mass per 100 parts by mass of the rubber component.

Any type of vulcanization accelerator may be used including those commonly used. Examples of such vulcanization accelerators include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide.(TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide or guanidine vulcanization accelerators.

In addition to the above-mentioned components, the rubber composition may appropriately contain other compounding agents commonly used in the tire industry such as release agents.

The rubber composition may be prepared by common methods. For example, the rubber composition may be prepared by kneading the components in a rubber kneading machine such as a Banbury mixer, a kneader, or an open roll mill, and vulcanizing the kneaded mixture.

The kneading conditions are as follows. In a base kneading step that includes kneading additives other than vulcanizing agents and vulcanization accelerators, the kneading temperature is usually 50 to 200° C., preferably 80 to 190° C., and the kneading time is usually 30 seconds to 30 minutes, preferably one minute to 30 minutes. In a final kneading step that includes kneading vulcanizing agents and vulcanization accelerators, the kneading temperature is usually 100° C. or lower, preferably from room temperature to 80° C. The composition obtained after kneading the vulcanizing agents and vulcanization accelerators is usually vulcanized by, for example, press vulcanization. The vulcanization temperature is usually 120 to 200° C., preferably 140 to 180° C.

The rubber composition is suitable for treads of tires and particularly for treads (monolayer treads, or cap treads of multilayer treads) of studless winter tires.

In view of the balance between snow and ice performance and handling stability, and other properties, the rubber composition (vulcanized rubber composition) preferably has an E* (complex modulus) at 0° C. of 3.0 to 8.0 MPa. The lower limit of the E* is more preferably 3.5 MPa or more.

In view of the balance between snow and ice performance and abrasion resistance, and other properties, the rubber composition (vulcanized rubber composition) preferably has a difference between the E* (complex modulus) at −10° C. and the E* at 10° C. ((E* at −10° C.)−(E* at 10° C.)) of 8.0 MPa or less, more preferably 7.0 MPa or less.

(Pneumatic Tire)

The pneumatic tire of the present invention may be produced using the rubber composition by usual methods. Specifically, the rubber composition containing the above-mentioned components, before vulcanization, may be extruded into the shape of a tread (e.g. a cap tread) and assembled with other tire components on a tire building machine in a usual manner to build an unvulcanized tire, which may then be heated and pressurized in a vulcanizer to produce a tire. The tire of the present invention is suitable for use as a studless winter tire, especially for passenger vehicles.

The tread of the pneumatic tire thus prepared preferably has a surface with pores. Such pores result from dissolution of the water-soluble fine particle during running under wet road conditions, or are formed by the foaming agent. The presence of pores on the tread surface makes the rubber flexible to improve low-temperature grip performance. Further, the cells or pores in the rubber can drain water to improve snow and ice performance.

The pores on the surface of the tread preferably have a pore size of 300 µm or less, more preferably 200 µm or less, still more preferably 150 µm or less. The lower limit of the pore size is not particularly critical, but is preferably 1 µm or more, more preferably 10 µm or more.

The "pore size" refers to the maximum pore size that may be measured by observing the tread surface with a transmission electron microscope (TEM). For example, it is the length of the longer diagonal line for a rhomboid image or the diameter for a circular (spherical) image.

EXAMPLES

The present invention will be specifically described below with reference to, but not limited to, examples.

[Measurement of Median Particle Size (Median Size) of Water-Soluble Fine Particle]

The median particle size of water-soluble fine particles was measured by laser diffraction using SALD-2000J (Shimadzu Corporation) as described below.

<Measurement Procedure>

The water-soluble fine particles were dispersed in a solution mixture of a dispersion solvent (toluene) and a dispersant (a 10% by mass solution of sodium di(2-ethylhexyl)sulfosuccinate in toluene) at room temperature. The dispersions were stirred for five minutes under ultrasonic irradiation to prepare test solutions. The test solutions were transferred to a batch cell, and one minute later the measurement was performed (refractive index: 1.70-0.20 i).

Synthesis Example 1, Synthesis of Modified BR

A 5 L autoclave purged with nitrogen was charged with 2.4 kg of cyclohexane and 300 g of 1,3-butadiene. Then, a catalyst composition (iodine atom/lanthanoid-containing compound molar ratio=2.0) was introduced into the autoclave, and a polymerization reaction was then performed for two hours at 30° C. to give a polymer solution. The catalyst composition was previously prepared by reacting and aging a solution of 0.18 mmol of neodymium versatate in cyclohexane, a solution of 3.6 mmol of methylalumoxane in toluene, a solution of 6.7 mmol of diisobutylaluminum hydride in toluene, and a solution of 0.36 mmol of trimethylsilyl iodide (hereinafter, also referred to as "Me$_3$SiI") in toluene with 0.90 mmol of 1,3-butadiene for 60 minutes at 30° C. To the polymer solution kept at a temperature of 30° C. was added a solution of 1.71 mmol of 3-glycidoxypropyltrimethoxysilane in toluene, and they were reacted for 30 minutes to give a reaction solution. To the reaction solution was added a solution of 1.28 mmol of tetraisopropyl titanate (hereinafter, also referred to as "IPOTi") in toluene, followed by stirring for 30 minutes. Then, a solution of 1.5 g of 2,4-di-tert-butyl-p-cresol in methanol was added to terminate the polymerization reaction. The resultant solution was used as a modified polymer solution (yield: 2.5 kg). To the modified polymer solution was added 20 L of an aqueous solution having a pH of 10 adjusted with sodium hydroxide, followed by solvent removal and a simultaneous condensation reaction at 110° C. for two hours. The resulting product was dried on rolls at 110° C. to obtain a high-cis BR having a polar group interactive with silica.

The modified BR thus prepared had a cis content of 96% by mass, a trans content of 4% by mass, and a Mw of 600,000.

The chemicals used in examples and comparative examples are listed below.

NR: RSS#3

Modified BR: the modified BR synthesized in Synthesis Example 1 (high-cis modified BR having a polar group interactive with silica)

Carbon black: Seast N220 available from Mitsubishi Chemical Corporation

Silica: Ultrasil VN3 (N$_2$SA: 172 m$^2$/g) available from Evonik Degussa

Silane coupling agent: Si266 available from Evonik Degussa

Terpene-based resin 1: α-pinene homopolymer (softening point: 130° C., Mn: 742 g/mol, Mz: 1538 g/mol, Mw: 1055 g/mol, Mw/Mn: 1.42, Tg: 81° C., limonene unit content: 0% by mass)

Terpene-based resin 2: pinene polymer (α-pinene content: 90% by mass, β-pinene content: 10% by mass, softening point: 130° C., Mn: 657 g/mol, Mz: 1332 g/mol, Mw: 917 g/mol, Mw/Mn: 1.40, Tg: 80° C., limonene unit content: 0% by mass)

Terpene-based resin 3: pinene polymer (α-pinene content: 20% by mass, β-pinene content: 80% by mass, softening point: 130° C., Mn: 790 g/mol, Mz: 1891 g/mol, Mw: 1101 g/mol, Mw/Mn: 1.57, Tg: 78° C., limonene unit content: 0% by mass)

Resin 4: α-methylstyrene resin (Sylvares SA120 available from Kraton Polymers, softening point: 120° C.)

Water-soluble fine particle 1: MN-00 available from Umai Chemical Co., Ltd. (magnesium sulfate, median particle size (median size): 75 μm)

Water-soluble fine particle 2: USN-00 available from Umai Chemical Co., Ltd. (extremely fine particle magnesium sulfate, median particle size (median size): 3 μm)

Water-soluble fine particle 3: sodium lignosulfonate available from Tokyo Chemical Industry Co., Ltd. (median particle size (median size): 100 μm)

Wax: Ozoace wax available from Nippon Seiro Co., Ltd.

Antioxidant: NOCRAC 6C available from Ouchi Shinko Chemical Industrial Co., Ltd.

Oil: PS-32 (mineral oil) available from Idemitsu Kosan Co., Ltd.

Stearic acid: "KIRI" available from NOF Corporation

Zinc oxide: zinc oxide #2 available from Mitsui Mining & Smelting Co., Ltd.

Sulfur: powdered sulfur available from Tsurumi Chemical Industry Co., Ltd.

Vulcanization accelerator: NOCCELER NS available from Ouchi Shinko Chemical Industrial Co., Ltd.

Examples and Comparative Examples

The natural rubber plus silica, or polybutadiene rubber plus silica were added in the amounts listed in Table 1 to a 1.7 L Banbury mixer and kneaded at 150° C. for three minutes to give a kneaded mixture (masterbatch). To the combined masterbatches were added the materials other than the sulfur and vulcanization accelerator, and they were kneaded at 150° C. for two minutes to give a kneaded mixture. The kneaded mixture was further kneaded with the sulfur and vulcanization accelerator using an open roll mill at 80° C. for five minutes to obtain an unvulcanized rubber composition.

The unvulcanized rubber compositions prepared as above were vulcanized at 170° C. for 15 minutes to obtain vulcanized rubber compositions (specimens).

Separately, the unvulcanized rubber compositions prepared as above were each formed into a cap tread shape and assembled with other tire components, followed by vulcanization at 170° C. for 15 minutes to prepare a test studless winter tire (tire size: 195/65R15).

The vulcanized rubber compositions (specimens) and test studless winter tires prepared as above were stored at room temperature in a dark place for three months and thereafter evaluated as follows. Table 1 shows the results.

<Ice Performance>

The performance of the test studless winter tires mounted on a car was evaluated on ice under the following conditions.

The test site was the Nayoro test track of Sumitomo Rubber Industries, Ltd. in Hokkaido, Japan. The air temperature was −5 to 0° C. The test tires were mounted on a front-engine, rear-wheel-drive car of 2000 cc displacement made in Japan. The distance required for the car traveling on ice to stop after the brakes that lock up were applied at 30 km/h was measured.

Ice performance indexes were calculated using the equation below, with Comparative Example 1 taken as reference. A higher index indicates better ice performance.

(Ice performance index)=(Brake stopping distance of Comparative Example 1)/(Stopping distance of each formulation example)×100

<Handling Stability>

Each set of test studless winter tires were mounted on the wheels of a test car (a front-engine, front-wheel-drive car of 2000 cc displacement made in Japan). A test driver drove the car in a zig-zag fashion and then subjectively evaluated the stability of steering control. The results are expressed as an index, with Comparative Example 1 set equal to 100. A higher index indicates better handling stability.

<Rolling Resistance (Fuel Economy)>

The rolling resistance of the test studless winter tires was measured with a rolling resistance tester by running each tire mounted on a 15×6 JJ rim at an internal pressure of 230 kPa, a load of 3.43 kN, and a speed of 80 km/h. The reciprocals of rolling resistances are expressed as an index, with Comparative Example 1 set equal to 100. A higher index indicates a lower rolling resistance and thus better fuel economy.

<Abrasion Resistance>

The abrasion loss of the vulcanized rubber compositions was measured using a Lambourn abrasion tester (Iwamoto Seisakusho Co., Ltd.) at a surface rotational speed of 50 m/min, an applied load of 3.0 kg, a sand fall rate of 15 g/min, and a slip ratio of 20%, and a reciprocal of the abrasion loss was calculated. In the table, the reciprocal of the abrasion loss of Comparative Example 1 is set equal to 100, and the reciprocals of the abrasion losses of the other formulation examples are expressed as an index. A higher index indicates better abrasion resistance.

As shown in Table 1, the balance of snow and ice performance, wet grip performance, abrasion resistance, and handling stability was significantly improved in the examples in which predetermined amounts of a terpene-based resin having predetermined softening point and α- and β-pinene unit contents, and a water-soluble fine particle and/or a foaming agent were added to a composition containing an isoprene-based rubber, polybutadiene rubber, silica, and carbon black.

The invention claimed is:

1. A pneumatic tire, comprising a tread,
   the tread comprising a rubber composition for treads comprising:
   a rubber component comprising an isoprene-based rubber and polybutadiene rubber;
   silica;
   carbon black;
   a terpene-based resin; and
   a water-soluble fine particle,
   the terpene-based resin having a softening point of 70 to 150° C., an α-pinene unit content of 65 to 100% by mass, and a β-pinene unit content of 0 to 35% by mass,
   the rubber component comprising, based on 100% by mass thereof, 20 to 80% by mass of the isoprene-based rubber and 20 to 80% by mass of the polybutadiene rubber, with a combined amount of the isoprene-based rubber and the polybutadiene rubber of 90% by mass or more,
   the rubber composition comprising, per 100 parts by mass of the rubber component, 20 to 200 parts by mass of the silica, 0.1 to 50 parts by mass of the carbon black, and 0.1 to 50 parts by mass of the terpene-based resin.

2. The pneumatic tire according to claim 1,
   wherein the terpene-based resin is at least one selected from the group consisting of α-pinene homopolymers, terpene-based resins having an α-pinene unit content of 99% by mass or higher, and copolymers containing an α-pinene unit and a β-pinene unit.

TABLE 1

| | | Example | | | | | Comparative Example | | |
|---|---|---|---|---|---|---|---|---|---|
| | | 1 | 2 | 3 | 4 | 5 | 1 | 2 | 3 |
| Amount (parts by mass) | NR | 40 | 40 | 40 | 40 | 40 | 40 | 40 | 40 |
| | Modified BR | 60 | 60 | 60 | 60 | 60 | 60 | 60 | 60 |
| | Carbon black | 5 | 5 | 5 | 5 | 5 | 5 | 5 | 5 |
| | Silica | 55 | 55 | 55 | 55 | 55 | 55 | 55 | 55 |
| | Silane coupling agent | 4 | 4 | 4 | 4 | 4 | 4 | 4 | 4 |
| | Terpene-based resin 1 | 25 | 25 | 25 | 25 | 25 | — | — | 25 |
| | Terpene-based resin 2 | — | — | — | — | — | — | — | — |
| | Terpene-based resin 3 | — | — | — | — | — | 25 | — | — |
| | Resin 4 | — | — | — | — | — | — | 25 | — |
| | Water-soluble fine particle 1 | 40 | 30 | 20 | — | — | 40 | 40 | — |
| | Water-soluble fine particle 2 | — | — | — | 40 | — | — | — | — |
| | Water-soluble fine particle 3 | — | — | — | — | 40 | — | — | — |
| | Wax | 1 | 1 | 1 | 1 | 1 | 1 | 1 | 1 |
| | Antioxidant | 2 | 2 | 2 | 2 | 2 | 2 | 2 | 2 |
| | Oil | 25 | 25 | 25 | 25 | 25 | 25 | 25 | 25 |
| | Stearic acid | 1 | 1 | 1 | 1 | 1 | 1 | 1 | 1 |
| | Zinc oxide | 1.5 | 1.5 | 1.5 | 1.5 | 1.5 | 1.5 | 1.5 | 1.5 |
| | Sulfur | 1.2 | 1.2 | 1.2 | 1.2 | 1.2 | 1.2 | 1.2 | 1.2 |
| | Vulcanization accelerator | 2 | 2 | 2 | 2 | 2 | 2 | 2 | 2 |
| Evaluation | Ice performance | 110 | 107 | 104 | 119 | 108 | 100 | 94 | 84 |
| | Handling stability | 108 | 106 | 106 | 107 | 103 | 100 | 99 | 95 |
| | Rolling resistance | 107 | 110 | 113 | 110 | 104 | 100 | 93 | 95 |
| | Abrasion resistance | 107 | 117 | 125 | 110 | 107 | 100 | 85 | 100 |

3. The pneumatic tire according to claim 1, wherein the water-soluble fine particle has a median particle size of 0.1 to 500 μm.

4. The pneumatic tire according to claim 1, wherein the water-soluble fine particle is at least one selected from the group consisting of magnesium sulfate, potassium sulfate, sodium chloride, calcium chloride, magnesium chloride, potassium carbonate, sodium carbonate, lignin derivatives, and saccharides.

5. The pneumatic tire according to claim 1, wherein the polybutadiene rubber has a cis content of 90% by mass or higher.

6. The pneumatic tire according to claim 1, wherein the polybutadiene rubber is a modified polybutadiene rubber that has been modified with a polar group interactive with silica.

7. The pneumatic tire according to claim 1, wherein the silica has a nitrogen adsorption specific surface area of 160 to 300 m²/g.

8. The pneumatic tire according to claim 1, wherein the rubber composition has an E* at 0° C. of 3.0 to 8.0 and a difference between E* at −10° C. and E* at 10° C. of 7.0 or less.

9. The pneumatic tire according to claim 1, wherein the tread has a surface with pores having a pore size of 300 μm or less.

10. The pneumatic tire according to claim 1, wherein the pneumatic tire is a studless winter tire.

11. The pneumatic tire according to claim 1, wherein the amount of a liquid plasticizer per 100 parts by mass of the rubber component is 25 parts by mass or less.

12. The pneumatic tire according to claim 1, wherein the water-soluble fine particle is magnesium sulfate.

* * * * *